US012598494B2

(12) United States Patent
Gurelli et al.

(10) Patent No.: US 12,598,494 B2
(45) Date of Patent: Apr. 7, 2026

(54) SIGNAL QUALITY MEASUREMENTS FOR IDENTIFYING INTELLIGENT REFLECTION SURFACES

(71) Applicant: QUALCOMM Incorporated, San Diego, CA (US)

(72) Inventors: Mehmet Izzet Gurelli, San Diego, CA (US); Qiang Wu, San Diego, CA (US); Junyi Li, Fairless Hills, PA (US); Raju Hormis, New York, NY (US); Tao Luo, San Diego, CA (US); Navid Abedini, Basking Ridge, NJ (US); Ozge Koymen, Princeton, NJ (US); Farideddin Fayazbakhsh, Chatham, NJ (US); Iyab Issam Sakhnini, San Diego, CA (US)

( * ) Notice: Subject to any disclaimer, the term of this patent is extended or adjusted under 35 U.S.C. 154(b) by 340 days.

(21) Appl. No.: 18/328,525

(22) Filed: Jun. 2, 2023

(65) Prior Publication Data
US 2024/0406769 A1      Dec. 5, 2024

(51) Int. Cl.
| | |
|---|---|
| *H04B 7/02* | (2018.01) |
| *H04B 7/04* | (2017.01) |
| *H04L 5/00* | (2006.01) |
| *H04W 24/08* | (2009.01) |

(52) U.S. Cl.
CPC ........ *H04W 24/08* (2013.01); *H04B 7/04013* (2023.05); *H04L 5/0048* (2013.01)

(58) Field of Classification Search
CPC .... H04B 7/04013; H04B 7/06; H04B 7/0617; H04B 7/0632; H04B 7/08; H04B 7/086; H04B 7/145; H04L 5/0048; H04L 25/02; H04L 25/0202; H04W 24/08
See application file for complete search history.

(56) References Cited

U.S. PATENT DOCUMENTS

| | | | | |
|---|---|---|---|---|
| 11,595,961 | B2 * | 2/2023 | Yang | H04B 7/026 |
| 12,316,404 | B2 * | 5/2025 | Wang | H04B 7/026 |
| 2022/0014935 | A1 * | 1/2022 | Haija | H04L 5/0048 |

(Continued)

FOREIGN PATENT DOCUMENTS

WO      2022221976 A1     10/2022

OTHER PUBLICATIONS

International Search Report and Written Opinion—PCT/US2024/028157—ISA/EPO—Aug. 16, 2024.

*Primary Examiner* — Frank Duong

(57)      ABSTRACT
Various aspects of the present disclosure generally relate to wireless communication. In some aspects, a network node may transmit, via a beam and via a first subset of intelligent reflection surfaces (IRSs), a first transmission comprising a first reference signal or a first sounding reference signal (SRS) request. The network node may obtain a first signal quality measurement based at least in part on the first transmission. The network node may transmit, via the beam and via a second subset of IRSs, a second transmission, the second transmission comprising a second reference signal or a second SRS request. The network node may obtain a second signal quality measurement based at least in part on the second transmission. The network node may identify at least one IRS based at least in part on the first signal quality measurement and the second signal quality measurement. Numerous other aspects are described.

30 Claims, 12 Drawing Sheets

(56) References Cited

U.S. PATENT DOCUMENTS

| | | | | |
|---|---|---|---|---|
| 2023/0171624 A1* | 6/2023 | Iwabuchi | ............. | H04W 24/08 |
| | | | | 370/252 |
| 2023/0308140 A1* | 9/2023 | Baligh | ............... | H04B 7/04013 |
| 2024/0048307 A1* | 2/2024 | Duan | .................... | H04L 5/0048 |
| 2024/0244564 A1* | 7/2024 | Duan | ........................ | G01S 5/02 |
| 2024/0298288 A1* | 9/2024 | Duan | ................... | H04W 64/00 |
| 2024/0388326 A1* | 11/2024 | Haghighat | ............. | H04B 7/063 |

* cited by examiner

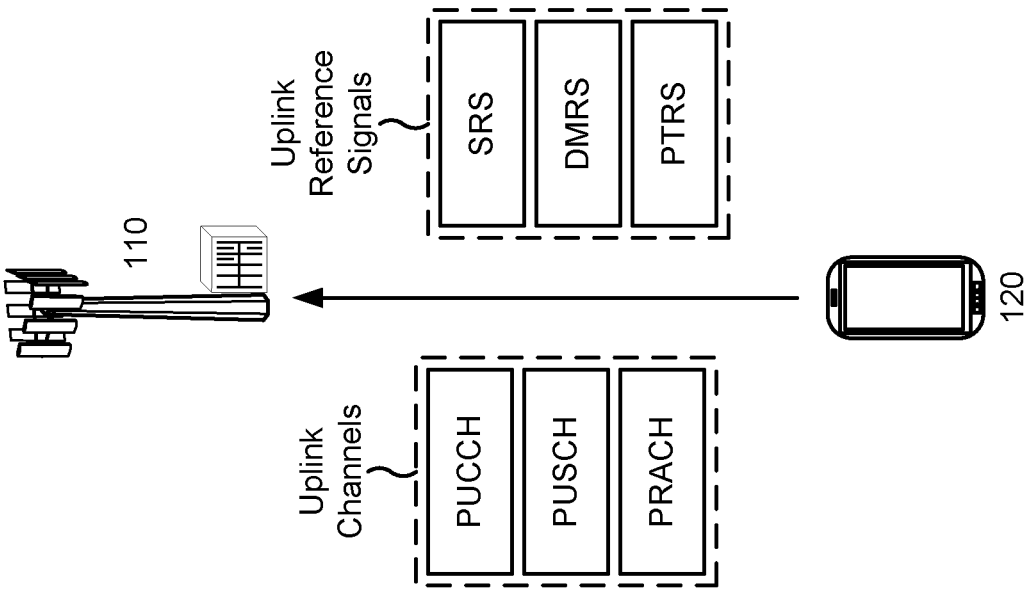
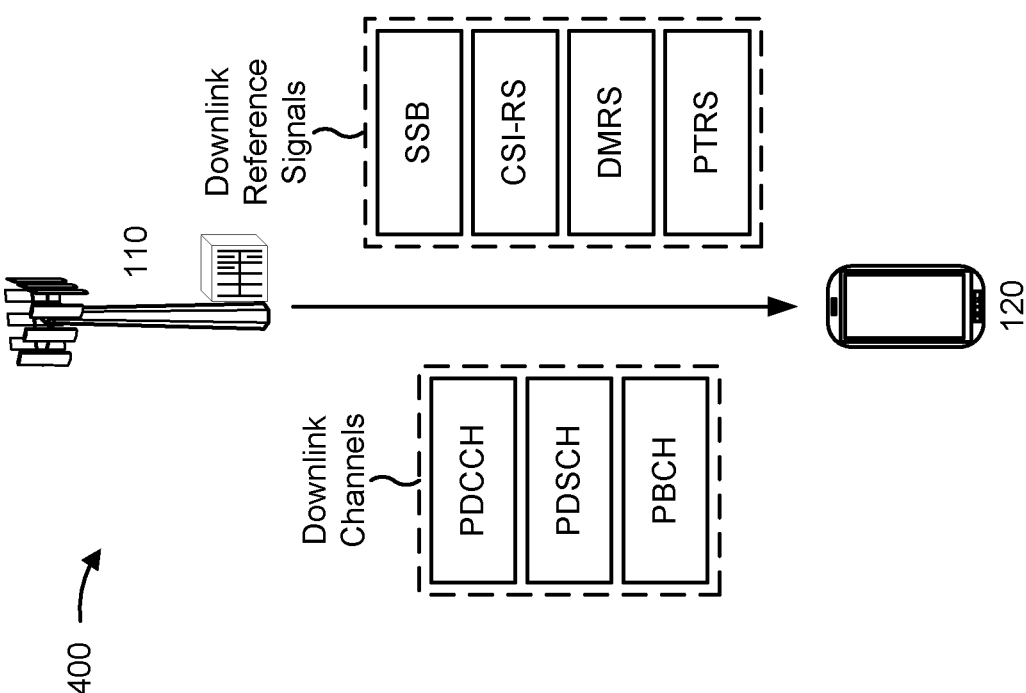
FIG. 4

1000 ⟶

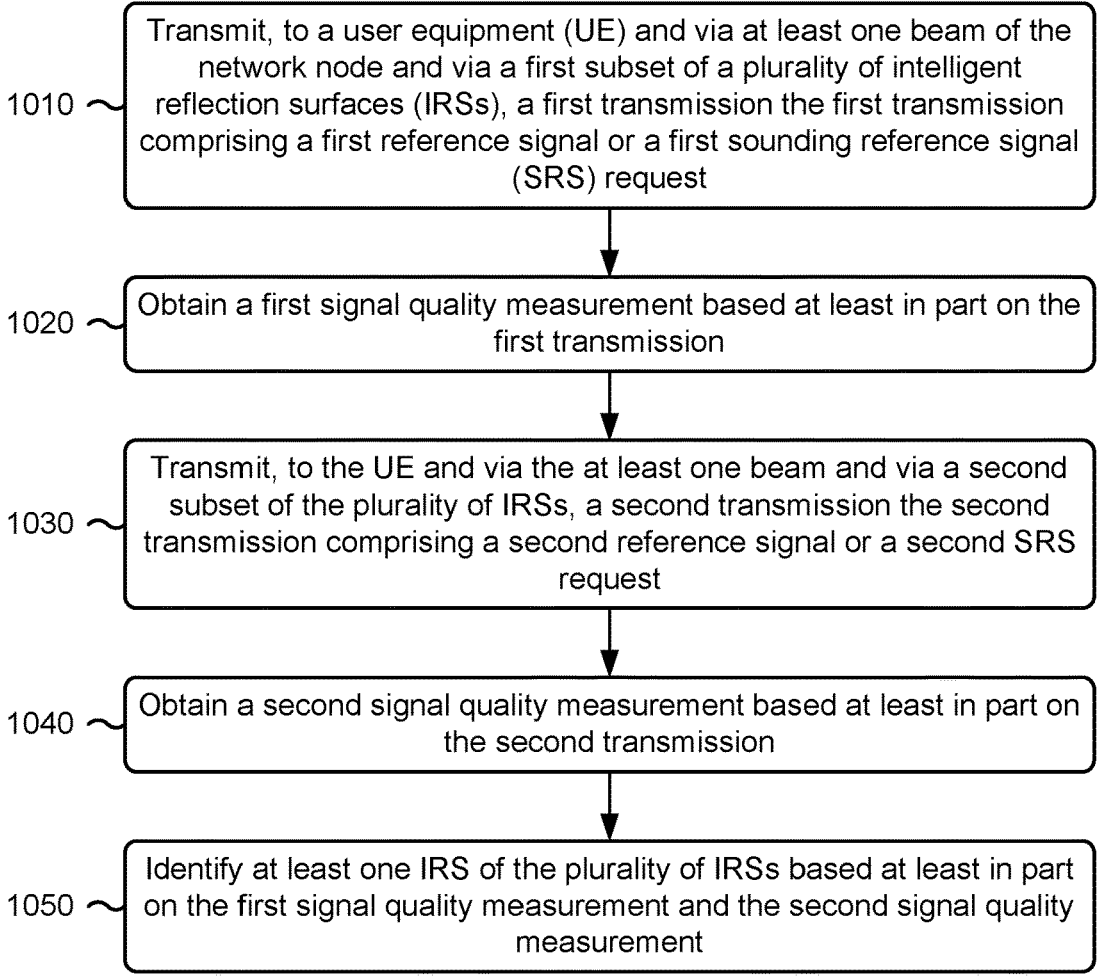

1010 Transmit, to a user equipment (UE) and via at least one beam of the network node and via a first subset of a plurality of intelligent reflection surfaces (IRSs), a first transmission the first transmission comprising a first reference signal or a first sounding reference signal (SRS) request 1020 Obtain a first signal quality measurement based at least in part on the first transmission 1030 Transmit, to the UE and via the at least one beam and via a second subset of the plurality of IRSs, a second transmission the second transmission comprising a second reference signal or a second SRS request 1040 Obtain a second signal quality measurement based at least in part on the second transmission 1050 Identify at least one IRS of the plurality of IRSs based at least in part on the first signal quality measurement and the second signal quality measurement

FIG. 10

SIGNAL QUALITY MEASUREMENTS FOR IDENTIFYING INTELLIGENT REFLECTION SURFACES

FIELD OF THE DISCLOSURE

Aspects of the present disclosure generally relate to wireless communication and to techniques and apparatuses for signal quality measurements for identifying intelligent reflection surfaces.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a network node. The method may include transmitting, to a UE and via at least one beam of the network node and via a first subset of a plurality of intelligent reflection surfaces (IRSs), a first transmission, the first transmission comprising a first reference signal or a first sounding reference signal (SRS) request. The method may include obtaining a first signal quality measurement based at least in part on the first transmission. The method may include transmitting, to the UE and via the at least one beam and via a second subset of the plurality of IRSs, a second transmission, the second transmission comprising a second reference signal or a second SRS request. The method may include obtaining a second signal quality measurement based at least in part on the second transmission. The method may include identifying at least one IRS of the plurality of IRSs based at least in part on the first signal quality measurement and the second signal quality measurement.

Some aspects described herein relate to a network node for wireless communication. The network node may include a memory and one or more processors coupled to the memory. The one or more processors may be configured to transmit, to a UE and via at least one beam of the network node and via a first subset of a plurality of IRSs, a first transmission, the first transmission comprising a first reference signal or a first SRS request. The one or more processors may be configured to obtain a first signal quality measurement based at least in part on the first transmission. The one or more processors may be configured to transmit, to the UE and via the at least one beam and via a second subset of the plurality of IRSs, a second transmission, the second transmission comprising a second reference signal or a second SRS request. The one or more processors may be configured to obtain a second signal quality measurement based at least in part on the second transmission. The one or more processors may be configured to identify at least one IRS of the plurality of IRSs based at least in part on the first signal quality measurement and the second signal quality measurement.

Some aspects described herein relate to a non-transitory computer-readable medium that stores a set of instructions for wireless communication by a network node. The set of instructions, when executed by one or more processors of the network node, may cause the network node to transmit, to a UE and via at least one beam of the network node and via a first subset of a plurality of IRSs, a first transmission, the first transmission comprising a first reference signal or a first SRS request. The set of instructions, when executed by one or more processors of the network node, may cause the network node to obtain a first signal quality measurement based at least in part on the first transmission. The set of instructions, when executed by one or more processors of the network node, may cause the network node to transmit, to the UE and via the at least one beam and via a second subset of the plurality of IRSs, a second transmission, the second transmission comprising a second reference signal or a second SRS request. The set of instructions, when executed by one or more processors of the network node, may cause the network node to obtain a second signal quality measurement based at least in part on the second transmission. The set of instructions, when executed by one or more processors of the network node, may cause the network node to identify at least one IRS of the plurality of IRSs based at least in part on the first signal quality measurement and the second signal quality measurement.

Some aspects described herein relate to an apparatus for wireless communication. The apparatus may include means for transmitting, to a UE and via at least one beam of the network node and via a first subset of a plurality of IRSs, a first transmission, the first transmission comprising a first reference signal or a first SRS request. The apparatus may include means for obtaining a first signal quality measurement based at least in part on the first transmission. The apparatus may include means for transmitting, to the UE and via the at least one beam and via a second subset of the plurality of IRSs, a second transmission, the second transmission comprising a second reference signal or a second SRS request. The apparatus may include means for obtaining a second signal quality measurement based at least in part on the second transmission. The apparatus may include means for identifying at least one IRS of the plurality of IRSs based at least in part on the first signal quality measurement and the second signal quality measurement.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals May include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of physical channels and reference signals in a wireless network, in accordance with the present disclosure.

FIG. 10 is a diagram illustrating an example process performed, for example, by a network node, in accordance with the present disclosure.

DETAILED DESCRIPTION

Figure 1:
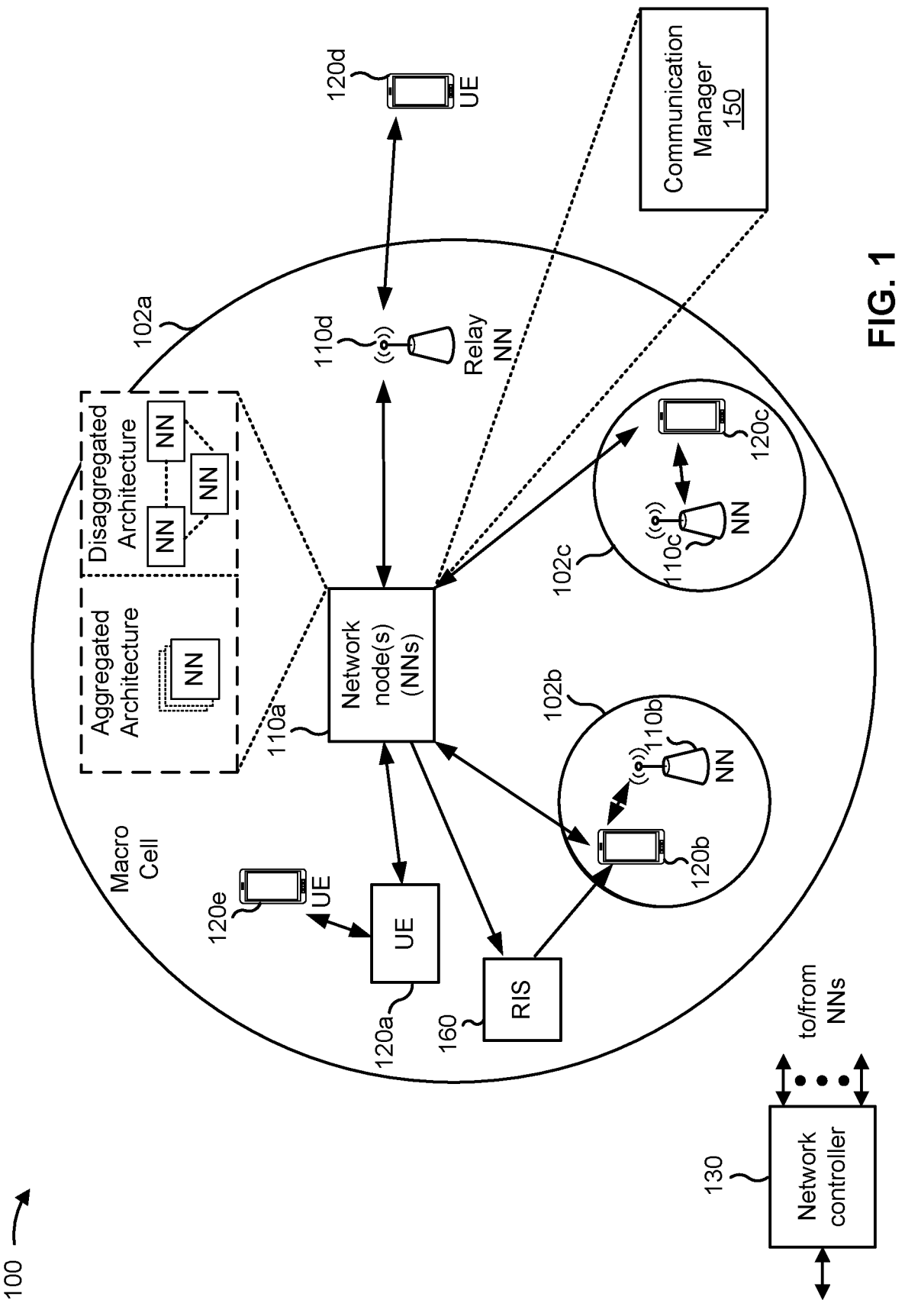
FIG. 1 is a diagram illustrating an example of a wireless network, in accordance with the present disclosure.

A network node may make use of multiple intelligent reflection surfaces (IRSs) for communications between the network node and a user equipment (UE). The use of multiple IRSs may improve network performance and reliability by providing the network node and UE with multiple paths for an indirect link via the IRSs. However, when using multiple IRSs to communicate with the UE, it may be difficult for the network node to determine which IRSs are contributing to (e.g., improving signal, performance, and/or reliability of) communications between the network node and the UE. In some situations, it may also be difficult to separately quantify the contributions of each individual IRS. For example, signal quality measurements may represent the signal quality for a communications link, but reference signals used for signal quality measurements may reflect off of multiple IRSs, making it difficult to tell which IRS is contributing to the most to signal quality. Without the ability to identify and/or quantify the IRSs contributing to communications, management of the IRSs may be inefficient, due to the difficulty in determining which IRSs should be configured or re-configured to improve the communications.

Some techniques and apparatuses described herein enable a network node to acquire signal quality measurements that are attributable to individual IRSs. For example, the network node may use the same beam to transmit reference signals and/or SRS requests via different IRSs and obtain signal quality measurements based at least in part on the transmissions. The network node may selectively activate and/or deactivate IRSs between transmissions to obtain the signal quality measurements from the different IRSs. Based at least in part on the signal quality measurements, the network node may identify which IRSs are contributing the most for communications between the network node and a UE.

By identifying which IRSs contribute the most to signal quality, the network node may manage the indirect link between the network node and the UE via the IRSs in a manner designed to take into account the effect each IRS has on the indirect link. For example, the network node may update parameters of the IRSs, activate and/or deactivate IRSs, and/or the like, in an effort to improve efficiency of the indirect link and improve the performance and reliability of the network.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities.

A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells.

In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120c) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V21) protocol, or a vehicle-to-pedestrian (V2P) protocol), and/or a mesh network. In such examples, a UE 120 may perform scheduling operations, resource selection operations, and/or other operations described elsewhere herein as being performed by the network node 110. In some aspects, an intelligent reflection surface (IRS) 160 may relay or reflect transmissions between UEs 120 or between a UE 120 and a base station 110. The IRS 160 is described in more detail in connection with FIGS. 5 and 6.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHZ-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the network node 110 may include a communication manager 150. As described in more detail elsewhere herein, the communication manager 150 may transmit, to a UE and via at least one beam of the network node and via a first subset of a plurality of IRSs, a first transmission, the first transmission comprising a first reference signal or a first SRS request; obtain a first signal quality measurement based at least in part on the first transmission; transmit, to the UE and via the at least one beam and via a second subset of the plurality of IRSs, a second transmission, the second transmission comprising a second reference signal or a second SRS request; obtain a second signal quality measurement based at least in part on the second transmission; and identify at least one IRS of the plurality of IRSs based at least in part on the first signal quality measurement and the second signal quality measurement. Additionally, or alternatively, the communication manager 150 may perform one or more other operations described herein.

As indicated above, FIG. 1 is provided as an example. Other examples may differ from what is described with regard to FIG. 1.

Figure 2:
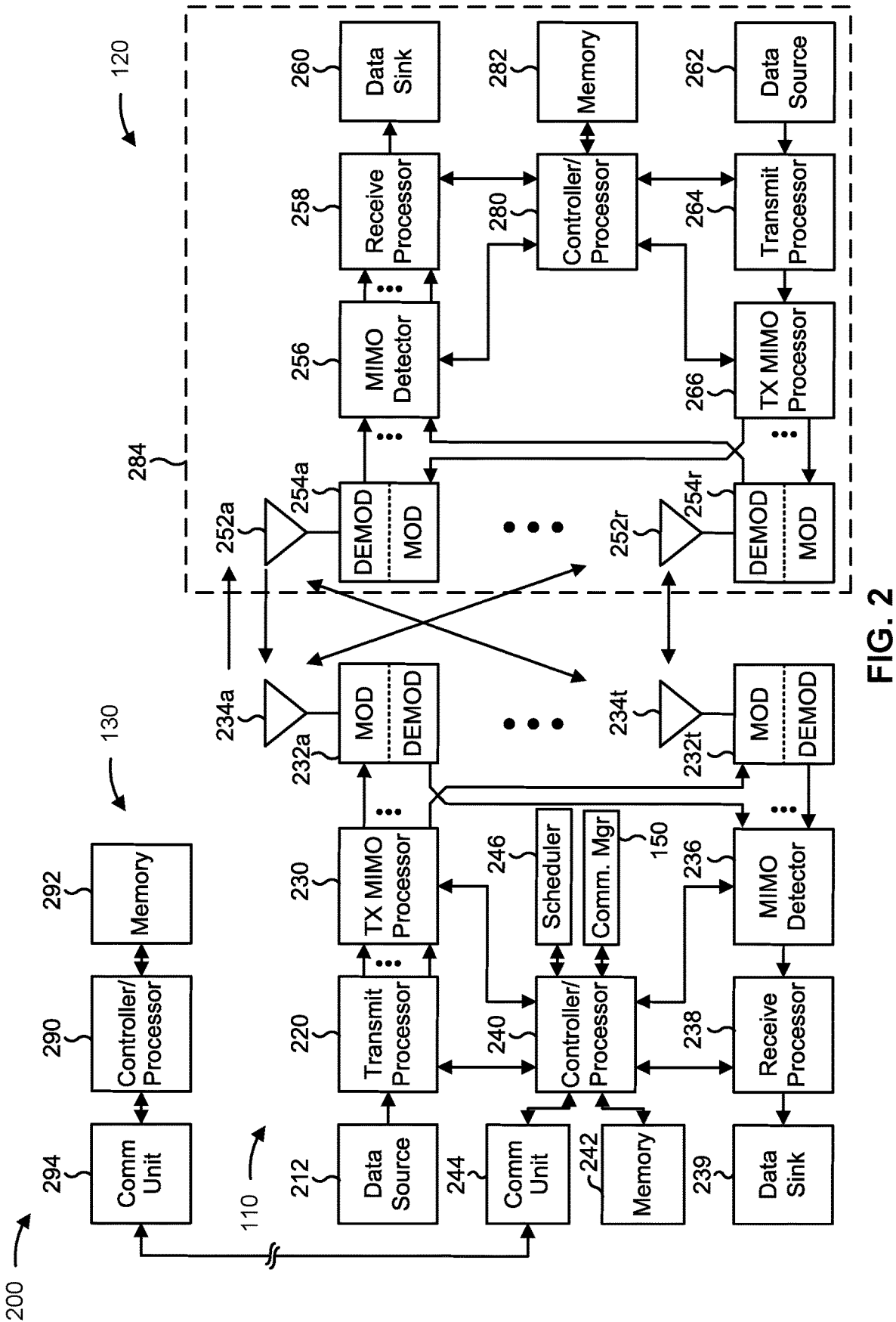
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP. RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-12).

The controller/processor 240 of the network node 110, the controller/processor 280 of the UE 120, and/or any other component(s) of FIG. 2 may perform one or more techniques associated with signal quality measurements for identifying IRSs, as described in more detail elsewhere herein. For example, the controller/processor 240 of the network node 110, the controller/processor 280 of the UE 120, and/or any other component(s) of FIG. 2 may perform or direct operations of, for example, process 1000 of FIG. 10 and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1000 of FIG. 10 and/or other processes as described herein. In some examples, executing instructions may include running the instructions, converting the instructions, compiling the instructions, and/or interpreting the instructions, among other examples.

In some aspects, the network node includes means for transmitting, to a UE and via at least one beam of the network node and via a first subset of a plurality of IRSs, a first transmission, the first transmission comprising a first reference signal or a first SRS request; means for obtaining a first signal quality measurement based at least in part on the first transmission; means for transmitting, to the UE and via the at least one beam and via a second subset of the plurality of IRSs, a second transmission, the second transmission comprising a second reference signal or a second SRS request; means for obtaining a second signal quality measurement based at least in part on the second transmission; and/or means for identifying at least one IRS of the plurality of IRSs based at least in part on the first signal quality measurement and the second signal quality measurement. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
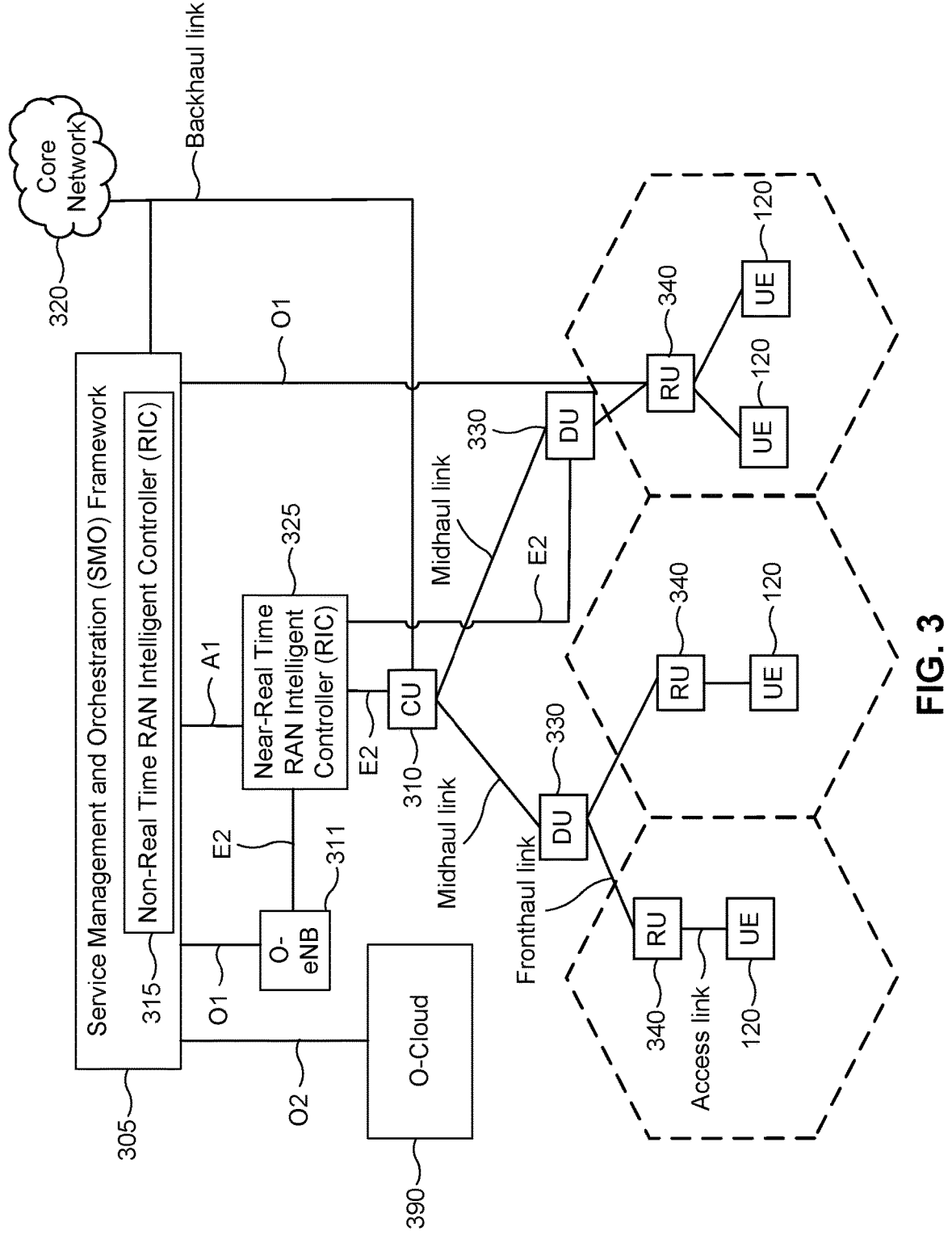
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-CNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework

305 (such as reconfiguration via an O1 interface) or via creation of RAN management policies (such as A1 interface policies).

As indicated above, FIG. 3 is provided as an example. Other examples may differ from what is described with regard to FIG. 3.

FIG. 4 is a diagram illustrating an example 400 of physical channels and reference signals in a wireless network, in accordance with the present disclosure. As shown in FIG. 4, downlink channels and downlink reference signals may carry information from a network node 110 to a UE 120, and uplink channels and uplink reference signals may carry information from a UE 120 to a network node 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a SRS, a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the network node 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The network node 110 may configure a set of CSI-RSs for the UE 120, and the UE 120 may measure the configured set of CSI-RSs. Based at least in part on the measurements, the UE 120 may perform channel estimation and may report channel estimation parameters to the network node 110 (e.g., in a CSI report), such as a channel quality indicator (CQI), a precoding matrix indicator (PMI), a CSI-RS resource indicator (CRI), a layer indicator (LI), a rank indicator (RI), or a RSRP, among other examples. The network node 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the network node 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring network nodes in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the network node 110 may then calculate a position of the UE 120 based on the RSTD measurements reported by the UE 120.

An SRS may carry information used for uplink channel estimation, which may be used for scheduling, link adaptation, precoder selection, or beam management, among other examples. The network node 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network node 110 may measure the SRSs, may perform channel estimation based at least in part on the measurements, and may use the SRS measurements to configure communications with the UE 120.

As indicated above, FIG. 4 is provided as an example. Other examples may differ from what is described with regard to FIG. 4.

Figure 5:
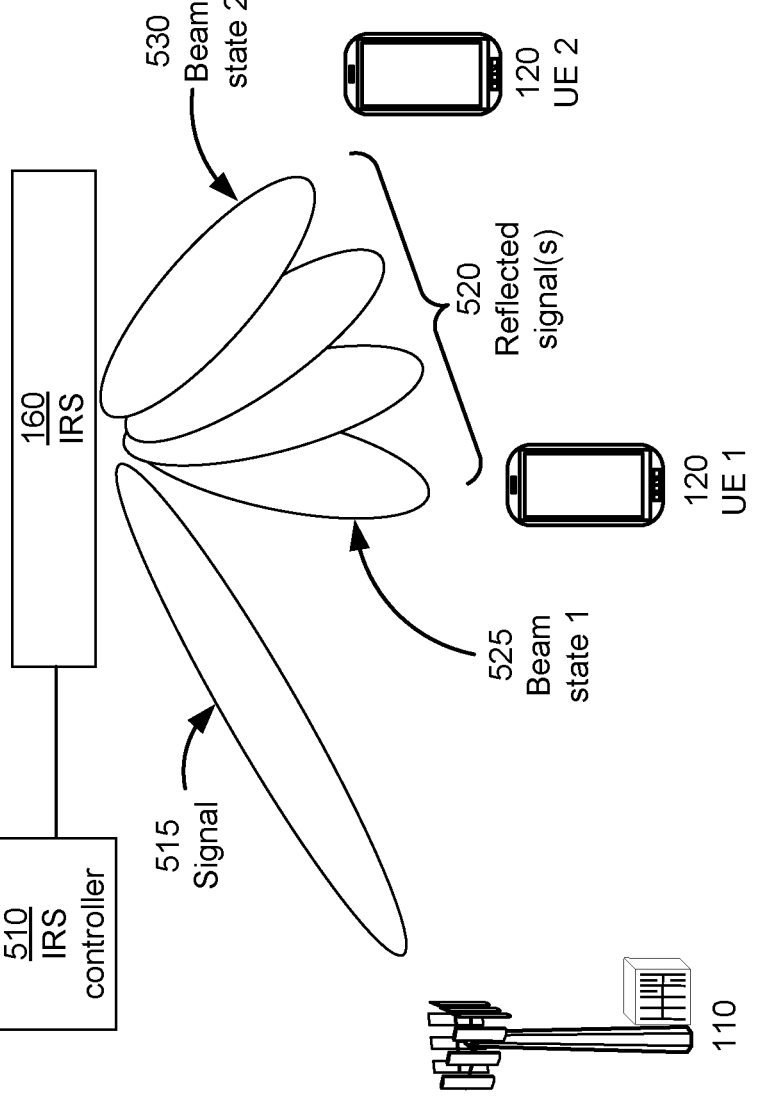
FIG. 5 is a diagram illustrating an example of communications using an intelligent reflection surface (IRS), in accordance with the present disclosure.

FIG. 5 is a diagram illustrating an example 500 of communications using an IRS, in accordance with the present disclosure. As shown in FIG. 5, a network node 110 may communicate with a UE 120 in a wireless network, such as the wireless network 100. The network node 110 and the UE 120 may use the IRS 160 to communicate with one another. For example, the IRS 160 may reflect or redirect a signal to the network node 110 and/or the UE 120. The IRS 160 may also be referred to as an intelligent reflecting surface, reflective intelligent surface, or reconfigurable intelligent surface. In some examples, the IRS 160 may be a repeater.

The IRS 160 may be, or may include, a planar or two-dimensional structure or surface that is designed to have properties to enable a dynamic control of signals or electromagnetic waves reflected and/or redirected by the IRS 160. The IRS 160 may include one or more reconfigurable elements. For example, the IRS 160 may include an array of reconfigurable elements (e.g., an array of uniformly distributed reconfigurable elements). The reconfigurable elements may be elements with a reconfigurable electromagnetic characteristic. For example, the electromagnetic characteristic may include a reflection characteristic (e.g., a reflection coefficient), a scattering characteristic, an absorption characteristic, and/or a diffraction characteristic. The electromagnetic characteristic(s) of each reconfigurable element may be independently controlled and changed over time. The electromagnetic characteristic(s) of each reconfigurable element may be independently configured such that the combination of configured states of the reconfigurable elements reflects an incident signal or waveform in a controlled manner. For example, the reconfigurable elements may be configured to reflect or redirect an impinging signal in a controlled manner, such as by reflecting the impinging signal in a desired direction, with a desired beam width, with a desired phase, with a desired amplitude, and/or with a desired polarization, among other examples. In other words, the IRS 160 may be capable of modifying one or more properties (e.g., direction, beam width, phase, amplitude, and/or polarization) of an impinging signal.

The reconfigurable elements of the IRS 160 may be controlled and/or configured by an IRS controller 510. The IRS controller 510 may be a control module (e.g., a controller and/or a processor) that is capable of configuring the electromagnetic characteristic(s) of each reconfigurable element of the IRS 160. The IRS controller 510 may be associated with certain components similar to the components described in connection with the UE 120 in connection with FIG. 2, such as a modem 254 and/or a similar component for purposes of communicating with a network node 110. The IRS controller 510 may receive control communications (e.g., from a network node 110 and/or a UE 120) indicating one or more properties of reflected signals (e.g., indicating a desired direction, a desired beam width, a desired phase, a desired amplitude, and/or a desired polarization). Therefore, in some examples, the IRS 160 may be capable of receiving communications (e.g., via the IRS 160 and/or the IRS controller 510). In some examples, the IRS 160 and/or the IRS controller 510 may not have transmit capabilities (e.g., the IRS 160 may be capable of reflecting and/or redirecting impinging signals via the reconfigurable elements but may not be capable of generating and/or transmitting signals). Alternatively, in some examples, the IRS 160 and/or the IRS controller 510 may have transmit capabilities (e.g., the IRS 160 may be capable of reflecting and/or redirecting impinging signals via the reconfigurable elements and may be capable of generating and/or transmitting signals). For example, the IRS 160 and/or the IRS controller 510 may include one or more antennas and/or antenna elements for receiving and/or transmitting signals.

For example, as shown in FIG. 5, the network node 110 may transmit a signal 515. The signal 515 may be transmitted in a spatial direction toward the IRS 160. The IRS 160 may configure the reconfigurable elements of the IRS 160 to reflect and/or redirect the signal 515 in a desired spatial direction and/or with one or more desired signal characteristics (e.g., beam width, phase, amplitude, frequency, and/or polarization). For example, as shown by reference number 520, the IRS 160 may be capable of reflecting the signal 515 in one or more spatial directions. Although multiple beams are shown in FIG. 5 representing different beam states or beam directions of the IRS 160, the IRS 160 may be capable of reflecting a signal with one beam state or one beam direction at a time. For example, in one case, as shown by reference number 525, the IRS 160 may be configured to reflect the signal 515 using a first beam state (e.g., beam state 1). "Beam state" may refer to a spatial direction and/or a beam of a reflected signal (e.g., a signal reflected by the IRS 160). The first beam state may cause the signal 515 to be reflected in a spatial direction toward a first UE 120 (e.g., UE 1). As shown by reference number 530, in another case, the IRS 160 may be configured to reflect the signal 515 using a second beam state (e.g., beam state 2). The second beam state may cause the signal 515 to be reflected in a spatial direction toward a second UE 120 (e.g., UE 2).

The IRS 160 may be deployed in a wireless network (such as the wireless network 100) to improve communication performance and efficiency. For example, the IRS 160 may enable a transmitter (e.g., a network node 110 or a UE 120) to control the scattering, reflection, and refraction characteristics of signals transmitted by the transmitter, to overcome the negative effects of wireless propagation. For example, the IRS 160 may effectively control signal characteristics (e.g., spatial direction, beam width, phase, amplitude, frequency, and/or polarization) of an impinging signal without a need for complex decoding, encoding, and radio frequency processing operations. Therefore, the IRS 160 may provide increased channel diversity for propagation of signals in a wireless network. The increased channel diversity provides robustness to channel fading and/or blocking, such as when higher frequencies are used by the network node 110 and/or the UE 120 (e.g., millimeter wave frequencies and/or sub-terahertz frequencies). Moreover, as the IRS 160 does not need to perform complex decoding, encoding, and radio frequency processing operations, the IRS 160 may provide a more cost and energy efficient manner of reflecting and/or redirecting signals in a wireless network (e.g., as compared to other mechanisms for reflecting and/or redirecting signals, such as a relay device).

As indicated above, FIG. 5 is provided as an example. Other examples may differ from what is described with respect to FIG. 5.

Figure 6:
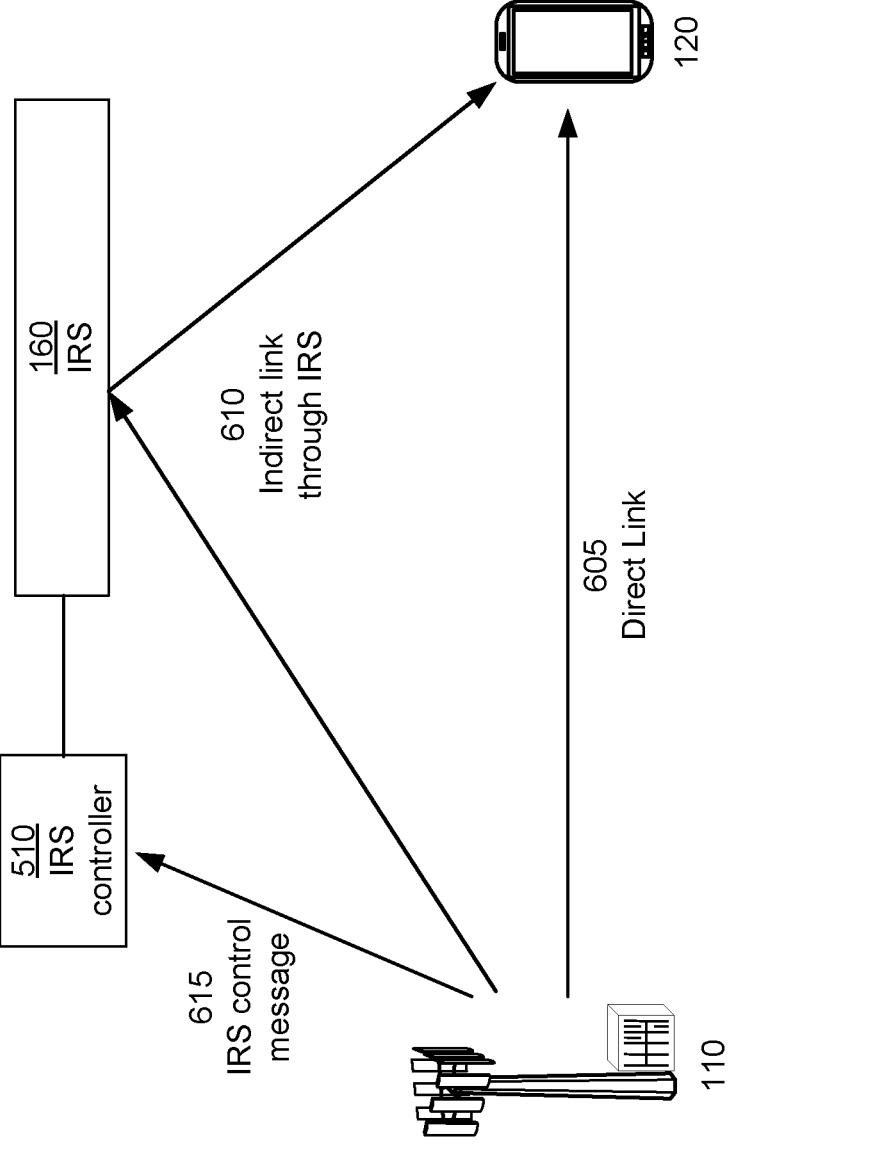
FIG. 6 is a diagram illustrating an example of communication links in a wireless network that includes an IRS, in accordance with the present disclosure.

FIG. 6 is a diagram illustrating an example 600 of communication links in a wireless network that includes an IRS, in accordance with the present disclosure. As shown, example 600 includes a network node 110, a UE 120, and the IRS 160. The IRS 160 may be controlled and/or configured by the IRS controller 510.

As shown in FIG. 6, the UE 120 may receive a communication (e.g., data and/or control information) directly from the network node 110 as a downlink communication. Additionally, or alternatively, the UE 120 may receive a communication (e.g., data and/or control information) indirectly from the network node 110 via the IRS 160. For example, the network node 110 may transmit the communication in a spatial direction toward the IRS 160, and the IRS 160 may redirect or reflect the communication to the UE 120.

In some examples, the UE 120 may communicate directly with the network node 110 via a direct link 605. For example, a communication may be transmitted via the direct link 605. A communication transmitted via the direct link 605 between the UE 120 and the network node 110 does not pass through and is not reflected or redirected by the IRS 160. In some examples, the UE 120 may communicate indirectly with the network node 110 via an indirect link 610. For example, a communication may be transmitted via different segments of the indirect link 610. A communication transmitted via the indirect link 610 between the UE 120 and the network node 110 is reflected and/or redirected by the IRS 160. As shown in FIG. 6 and by reference number 615, the network node 110 may communicate with the IRS 160 (e.g., with the IRS controller 510) via a control channel. For example, the network node 110 may indicate, in an IRS control message, spatial direction(s) and/or signal characteristics for signals reflected by the IRS 160. The IRS controller 510 may configure reconfigurable elements of the IRS 160 in accordance with the IRS control message. In some examples, the IRS control message may indicate information associated with the wireless network, such as a frame structure, time synchronization information, and/or slot boundaries, among other examples. Using the communication scheme shown in FIG. 6 may improve network performance and increase reliability by providing the UE 120 with link diversity for communicating with the network node 110.

In some cases, the UE 120 may receive a communication (e.g., the same communication) from the network node 110 via both the direct link 605 and the indirect link 610. In other cases, the network node 110 may select one of the links (e.g., either the direct link 605 or the indirect link 610) and may transmit a communication to the UE 120 using only the selected link. Alternatively, the network node 110 may receive an indication of one of the links (e.g., either the direct link 605 or the indirect link 610) and may transmit a communication to the UE 120 using only the indicated link. The indication may be transmitted by the UE 120 and/or the IRS 160. In some examples, such selection and/or indication may be based at least in part on channel conditions and/or link reliability.

As indicated above, FIG. 6 is provided as an example. Other examples may differ from what is described with respect to FIG. 6.

Figure 7:
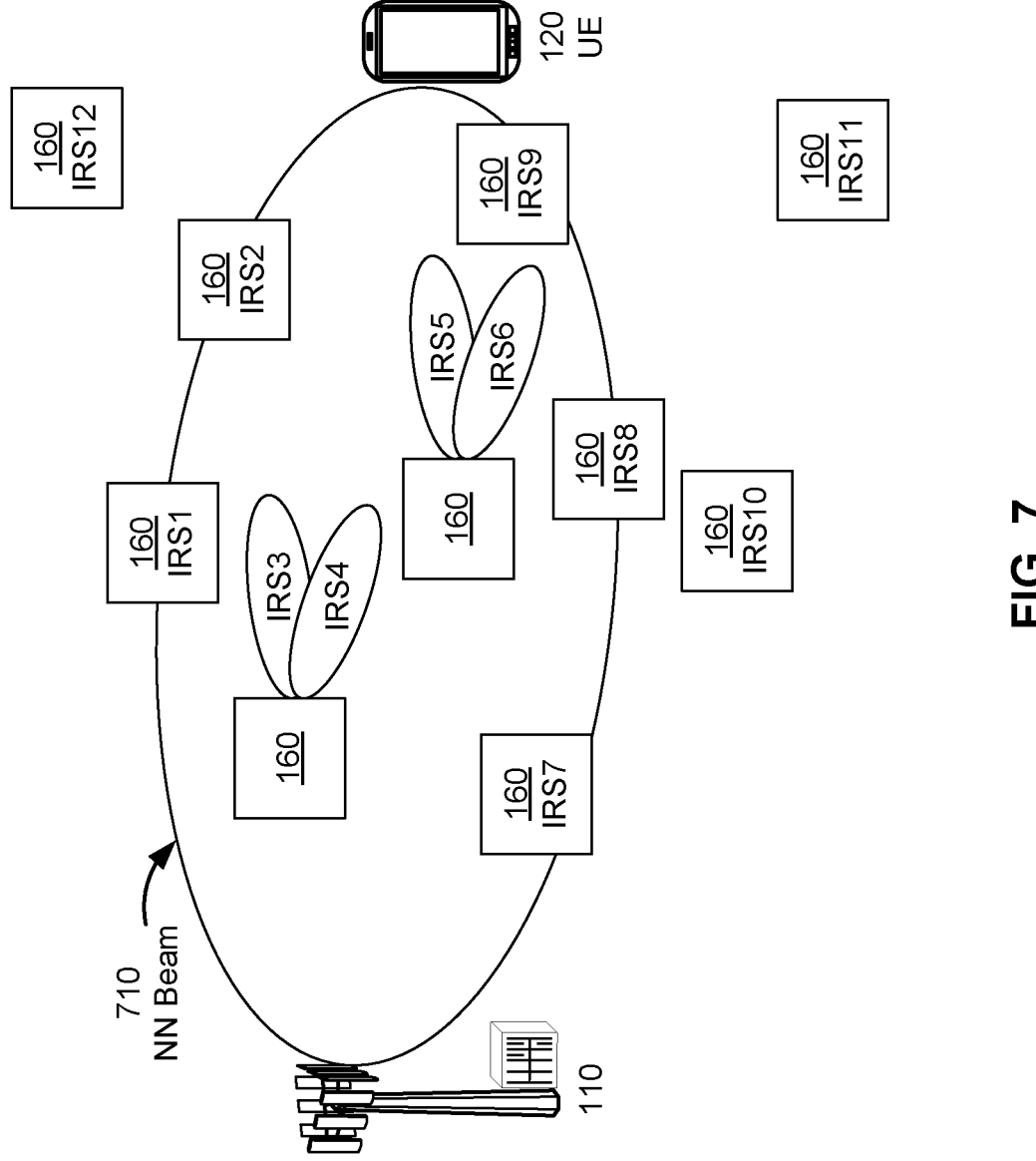
FIG. 7 is a diagram illustrating an example of communications using multiple IRSs, in accordance with the present disclosure.

FIG. 7 is a diagram illustrating an example 700 of communications using multiple IRSs, in accordance with the present disclosure. As shown, example 700 includes a network node 110, a UE 120, and multiple IRSs 160. The IRSs 160 may be controlled and/or configured by the network node 110.

As shown in FIG. 7, the network node 110 may communicate with the UE 120 using beam 710, the beam 710 may be reflected by one or more of the IRSs 160. While depicted as communicating using a single beam 710, the network node 110 and/or the UE may communicate using multiple beams. In some aspects, IRSs may be associated with one or more identifiers, which may be referred to as IRS indices, to identify the IRS (e.g., to the network node 110). An IRS using a single beam for communications (e.g., a single wide beam) may have a single IRS index to identify the IRS. An IRS using multiple beams for communications (e.g., beams with different characteristics) may have multiple IRS indices to identify each beam separately. For example, IRS indices IRS1 and IRS2 identify respective single beam IRSs, while IRS3 and IRS4 identify separate beams that originate from a single IRS 160.

Using multiple IRSs 160 for communications between a network node 110 and UE 120 may further improve network performance and increase reliability by providing the UE 120 with additional paths for an indirect link via the IRSs 160. However, when using multiple IRSs 160 to communicate with the UE 120, it may be difficult for the network node 110 to determine which IRSs 160 are contributing to (e.g., improving signal, performance, and/or reliability of) communications between the network node 110 and the UE

120. In some situations, it may also be difficult to separately quantify the contributions of each individual IRS 160. For example, signal quality measurements may represent the signal quality for a communications link, but reference signals used for signal quality measurements may reflect off of multiple IRSs 160, making it difficult to tell which IRS 160 is contributing most to the signal quality. Without the ability to identify and/or quantify the IRSs 160 contributing to communications, management of the IRSs 160 may be inefficient, due to the difficulty in determining which IRSs 160 should be configured or re-configured to improve the communications.

As indicated above, FIG. 7 is provided as an example. Other examples may differ from what is described with respect to FIG. 7.

Some techniques and apparatuses described herein enable a network node to acquire signal quality measurements that are attributable to individual IRSs. For example, the network node may use the same beam to transmit reference signals and/or SRS requests via different IRSs and obtain signal quality measurements based at least in part on the transmissions. The network node may selectively activate and/or deactivate IRSs between transmissions to obtain the signal quality measurements from the different IRSs. Based at least in part on the signal quality measurements, the network node may identify which IRSs are contributing the most for communications between the network node and a UE. As a result, the network node may manage the indirect link between the network node and the UE via the IRSs in a manner designed to take into account the effect each IRS has on the indirect link. For example, the network node may update parameters of the IRSs, activate and/or deactivate IRSs, and/or the like, in an effort to improve efficiency of the indirect link and improve the performance and reliability of the network.

Figure 8:
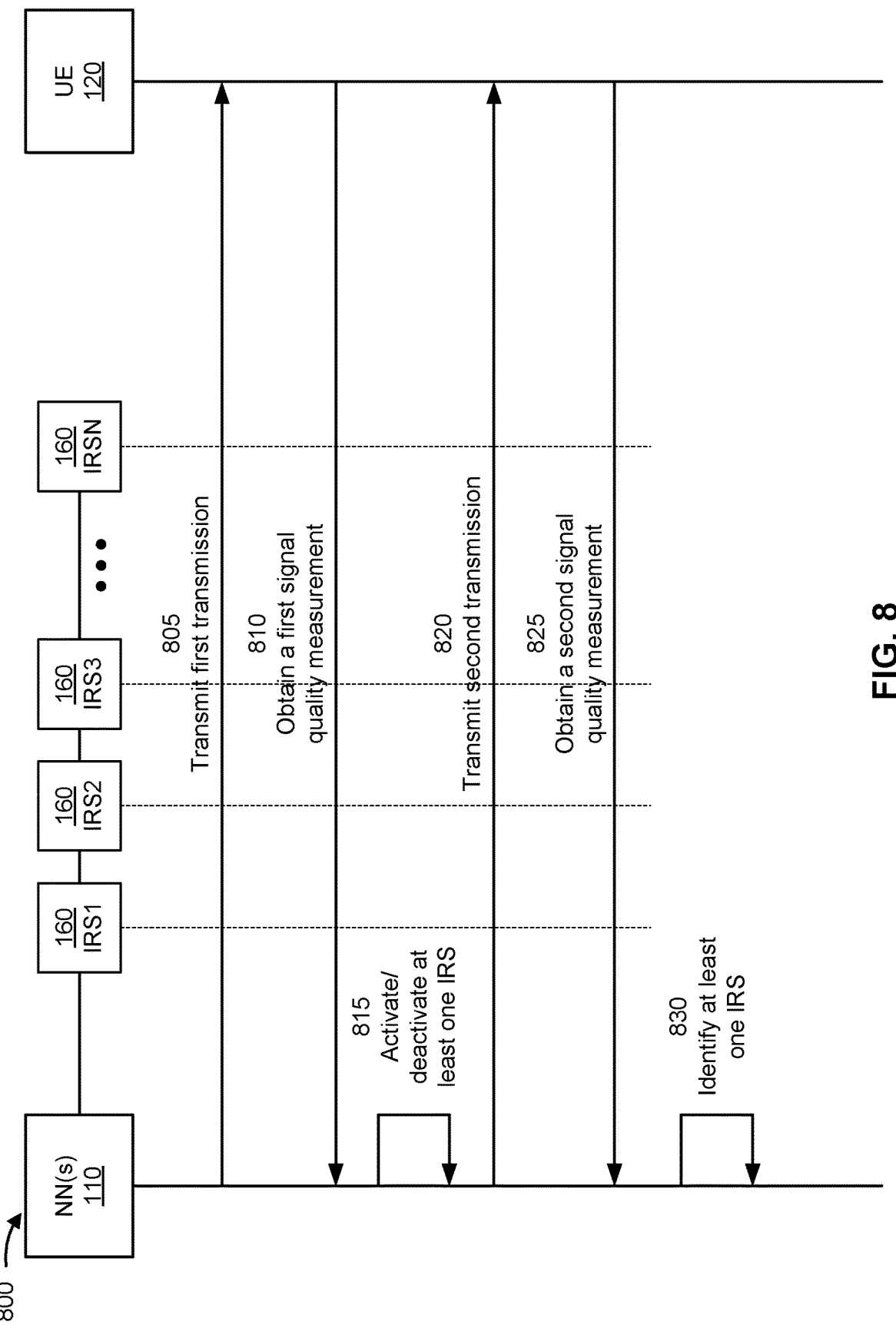
FIG. 8 is a diagram illustrating an example associated with signal quality measurements for identifying IRSs, in accordance with the present disclosure.

FIG. 8 is a diagram illustrating an example 800 associated with signal quality measurements for identifying IRSs, in accordance with the present disclosure. As shown in FIG. 8, a network node (e.g., network node 110) and a UE (e.g., UE 120) may communicate with one another via one or more IRSs (e.g., IRSs 160). As used herein, when referring to an IRS or IRS index, this may encompass an individual IRS device with a wide beam or an individual beam of an IRS, as each beam may have its own IRS index.

As shown by reference number 805, the network node may transmit, and the UE may receive, via at least one beam of the network node and via a first subset of IRSs, a first transmission. The first transmission may include a first reference signal or a first SRS request. For example, to measure signal strength, the network node may transmit a reference signal (e.g., CSI-RS or SSB, among other examples). The UE may measure a received reference signal and report a measure of signal strength (e.g., RSSI or RSRP, among other examples). As another example, the network node may transmit an SRS request and the UE may, based at least in part on receiving the SRS request, transmit an SRS, the strength of which can be measured by the network node.

In some aspects, the network node may deactivate each IRS, except for the first subset of IRSs, prior to the first transmission. In this way, the network node may measure signal quality when only the first subset of IRSs is active, which may inform the network node of the contributions of the first subset of IRSs to the signal quality of communications between the network node and the UE.

As shown by reference number 810, the network node may obtain a first signal quality measurement based at least in part on the first transmission. In some aspects, in a situation where the network node transmitted a reference signal, such as a CSI-RS or SSB, the first signal quality measurement may be a signal quality measurement received from the UE as the result of transmitting the reference signal. The first signal quality measurement may be, for example, an RSSI or RSRP, among other examples, obtained from a report transmitted by the UE, such as a CSI report. In some aspects, in a situation where the network node transmitted an SRS request, the first signal quality measurement may be a signal quality measurement that was measured by the network node as a result of receiving the SRS from the UE. While described herein as working with CSI-RS, SSB, and/or SRS reference signals, other signals, or combinations of signals, may be used to measure signal quality.

As shown by reference number 815, in some aspects, the network node may activate and/or deactivate one or more IRSs. For example, to measure signal strength from different sets of IRSs, the network node may activate and deactivate IRSs when transmitting and obtaining reference signals, such that signal strength may be measured for different combinations of IRSs and for individual IRSs. Different methods, described further herein, may be used to determine the order in which the IRSs are activated and/or deactivated. For example, IRSs may be activated and/or deactivated one at a time, or multiple at a time, based on IRS index values, logical IRS groupings, and/or geographic locations of the IRSs, among other examples.

As shown by reference number 820, the network node may transmit, and the UE may receive, via the same beam(s) of the network node and via a second subset of IRSs, a second transmission. The second transmission may include a second reference signal or a second SRS request. The second subset of IRSs may be different from the first subset of IRSs. The second transmission may be similar to the first transmission to enable the network node to measure signal strength for a different subset of IRSs.

In some aspects, the network node may deactivate each IRS, except for the second subset of IRSs, prior to the second transmission. In this way, the network node may measure signal quality when only the second subset of IRSs is active, which may inform the network node of the contributions of the second subset of IRSs to the signal quality of communications between the network node and the UE.

As shown by reference number 825, the network node may obtain a second signal quality measurement based at least in part on the second transmission. The second signal quality measurement may be obtained in a manner similar to the first signal quality measurement. For example, the second signal quality measurement may include an RSSI and/or RSRQ measurement, provided by the UE in response to a reference signal or generated by the network node (e.g., by measuring an SRS or other reference signal transmitted by the UE).

In some aspects, the first and second signal quality measurements are obtained as part of a sweep of IRSs by the network node. Different methods of sweeping through IRSs to obtain signal quality measurements may be used. In some aspects, the network node may linearly sweep through the IRSs associated with a particular network node beam to obtain multiple signal quality measurements, one for each IRS. For example, for each IRS, the network node may deactivate all other IRSs and obtain a signal quality measurement from the one active IRS. In this way, the network node is able to compare signal quality measurements from all IRSs for a particular beam to identify which IRS(s) contribute the most to signal quality between the network node and the UE.

In some aspects, the network node may logarithmically sweep through the IRSs associated with a network node beam. For example, rather than sweeping through each individual IRS, the network node may sweep through subsets of multiple IRSs to identify which subsets contribute most to signal quality.

In some aspects, each IRS is associated with an IRS index, which may be represented by a bit string. For example, an 8-bit bit string may be used to represent up to 256 different IRSs, from 00000000 to 11111111. The network node may sweep through IRSs grouped in subsets by matching bit values in different positions of the bit string. For example, the network node may obtain a first signal quality measurement for each IRS with a 1 in the least significant bit position, a second signal quality measurement for each IRS with a 1 in the next least significant bit position, a third signal quality measurement for the next least significant bit position, and so on, until all IRS indices have been swept. By determining signal quality at each bit position, the network node will be able to determine IRS identifier(s) for the IRS(s) that contribute to the signal quality between the network node and a UE. An example of this method of logarithmically sweeping through IRSs is discussed further, herein.

In some aspects, each IRS is associated with a location, and different subsets of IRSs may be based at least in part on the locations. For example, the network node may group together IRSs into subsets that are geographically within a threshold proximity of one another. In some aspects, the network node may sweep through each subset to identify which subset(s) contribute to the signal quality. In some aspects, the network node may sweep through one IRS in each different subset to identify which subset(s) contribute to the signal quality.

While different methods of sweeping are described herein, different combinations of sweeping may be used. For example, after logarithmically sweeping through IRSs to identify a subset that contributes to the signal quality, the network node may then perform another sweep (e.g., logarithmic or linear), to further narrow down the IRSs that contribute the most to signal quality.

As shown by reference number 830, the network node may identify at least one IRS. For example, the network node may identify the IRS with the highest contribution to signal strength based at least in part on the signal quality measurements. In some aspects one or more signal quality thresholds may be used to identify the at least one IRS. For example, each IRS associated with a signal quality measurement that satisfies a threshold may be identified as a contributing IRS. Multiple thresholds may be used, for example, to differentiate between IRSs with different levels of contribution to signal quality. In some aspects, IRSs may be ranked according to their corresponding signal quality measurements. In this situation, the network node may identify one IRS (or subset of IRSs) as a higher contributor than another IRS (or another subset of IRSs) based on the rankings.

In some aspects, the network node may deactivate all IRSs and transmit a baseline transmission while the IRSs are deactivated to determine a baseline signal quality measurement. The baseline signal quality measurement may be useful, for example, the determine whether a subset of IRSs contributes to signal quality. For example, if the signal quality measurement with one subset of IRSs active is the same as the baseline signal quality measurement, it is unlikely that any IRSs in the subset are contributing to the quality of communications between the network node and the UE.

In some aspects, a UE may change location during or after the process of identifying the IRSs that contribute to signal quality. In this situation, the network node may sweep through a second set of IRSs to obtain other signal quality measurements for the second set of IRSs. The second set of IRSs may include IRSs not included in the original set of IRSs being swept. In some aspects, the second set of IRSs may be selected by the network node based on the second set of IRSs including neighboring IRSs of those in the first set of IRSs being swept. By limiting the second set of IRSs to neighbor IRSs, the network node may limit the pool of IRSs to be swept for signal quality measurements.

As described herein, a subset may include one or multiple IRSs. The methods described herein may be applied to individual IRS indices, such that IRS beams with separate IRS indices are treated as separate IRSs, even if the IRS beams originate from the same device. In addition, while the process is described as working for one network node beam, the process may be repeated for different network node beams. In addition, while signal quality measurements are described with respect to one UE, the same methods may be applied to multiple UEs. In some aspects, the signal quality measurements may be obtained, and the contributing IRS(s) identified, for multiple UEs via one sweep. For example, the network node may send and receive transmissions to and from multiple UEs for each subset of IRSs swept.

Based at least in part on the signal quality measurements, the network node may identify which IRSs are contributing the most for communications between the network node and the UE. As a result, the network node may manage the indirect link between the network node and the UE via the IRSs in a manner designed to take into account the effect each IRS has on the indirect link. For example, the network node may update parameters of the IRSs, activate and/or deactivate IRSs, and/or the like, in an effort to improve efficiency of the indirect link and improve the performance and reliability of the network.

As indicated above, FIG. 8 is provided as an example. Other examples may differ from what is described with respect to FIG. 8.

Figure 9:
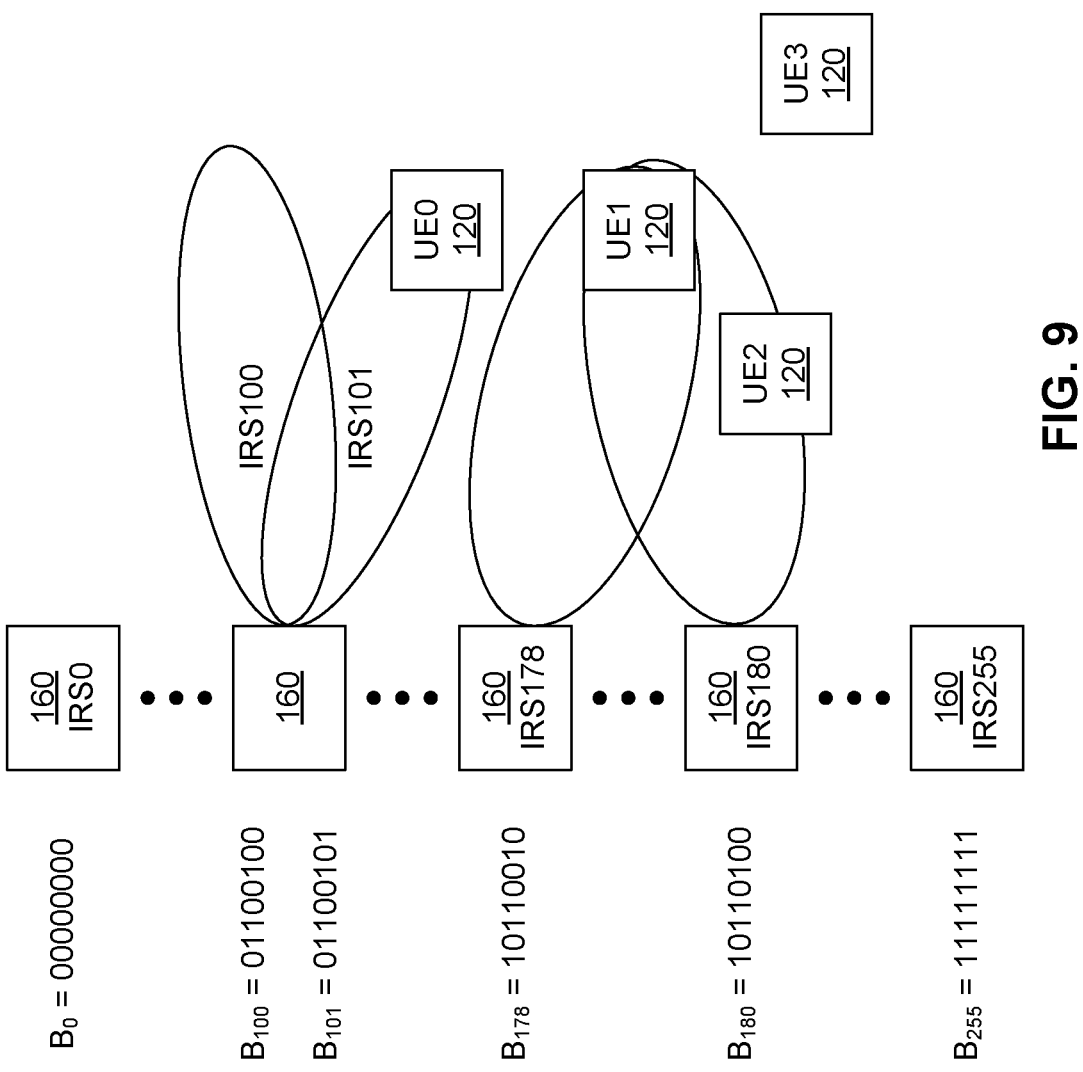
FIG. 9 is a diagram illustrating an example of logarithmic identification of IRSs contributing to signal quality, in accordance with the present disclosure.

FIG. 9 is a diagram illustrating an example 900 of logarithmic identification of IRSs contributing to signal quality, in accordance with the present disclosure. As shown in FIG. 9, multiple IRSs (e.g., IRS 160) may be in communication multiple UEs (e.g., UE 120). For example, the IRSs may be identified by bit strings representing different IRS indices (e.g., 00000000 for IRS0, 01100100 for IRS100, 01100101 for IRS101, 10110010 for IRS178, 10110100 for IRS180, and 11111111 for IRS 255).

As shown by the example 900, IRS101 contributes to signal quality for UE0, IRS178 and IRS180 contribute to signal quality for UE1, IRS180 contributes to signal quality for UE2, and none of the IRSs contribute to signal quality for UE3. A logarithmic sweep of the IRSs may enable the network node to determine which IRSs contribute to which UEs.

For example, the network node may first perform a baseline measurement with all IRSs deactivated to be able to determine when an activated subset of IRSs contributes to signal quality. The network node or the UE may measure signal strength with only the IRSs with a 0 in the least significant bit enabled (e.g., all IRSs with even IRS indices), followed by measuring signal strength with only IRSs with a 1 in the least significant bit enabled (e.g., all IRSs with odd IRS indices). Each of the two measurements may be compared to the baseline measurement to determine if there are IRSs in each of the two sets (e.g., IRSs with a 0 in the least significant bit and IRSs with a 1 in the least significant bit) that contribute to the signal strength between the network node and the UE. If neither set produces an improvement in signal strength over the baseline measurement, then the UE may be outside the range of any IRS. If only one of the sets show an improvement in signal strength, then the IRS(s) that contribute to the signal strength must have the corresponding bit value in the least significant bit position. If both measurements show an improvement, then there must be at least one IRS in each set that contributes to the signal strength. If both sets of IRSs contribute to the signal strength, the bit value may be identified as indeterminate (e.g., denoted by a "?"). This procedure may be repeated for each bit position of the IRS indices.

In the example 900, after the signal strength measurements, the network node may be able to determine that none of the IRSs contribute to UE3 if none of the IRSs contributed to improving signal strength for UE3 over the baseline measurement for UE3. UE0 and UE2 may be uniquely identified by the network node after performing a sweep through each bit, as there is only one bit string value (and one IRS) that contributes to signal quality for each of UE0 and UE2. For UE1, both the second and third least significant bit positions may be unknown, as the active IRSs for the second and third least significant bit positions both represented a contribution to signal quality. In this situation, the network node may determine the IRS bit identifier may be: 10110?? 0, where each '?' represents a bit position where a corresponding IRS contributed to signal quality for UE1. In this situation, a linear sweep may be performed to identify individual signal quality contributions for IRS178 and IRS180 with respect to UE1.

In some situations, the network node may determine that only one bit value is represented by a contributing IRS. In the example 900, both the fourth and sixth least significant bits will have the same result for all UEs. Accordingly, this bit position may be known as either a contributor (or a non-contributor), which may enable the network node to assume the value in that bit position in future sweeps, which may enhance the efficiency of sweeping through the IRSs.

As indicated above, FIG. 9 is provided as an example. Other examples may differ from what is described with respect to FIG. 9.

FIG. 10 is a diagram illustrating an example process 1000 performed, for example, by a network node, in accordance with the present disclosure. Example process 1000 is an example where the network node (e.g., network node 110) performs operations associated with signal quality measurements for identifying intelligent reflection surfaces.

As shown in FIG. 10, in some aspects, process 1000 may include transmitting, to a UE and via at least one beam of the network node and via a first subset of a plurality of IRSs, a first transmission, the first transmission comprising a first reference signal or a first SRS request (block 1010). For example, the network node (e.g., using transmission component 1204 and/or communication manager 1206, depicted in FIG. 12) may transmit, to a UE and via at least one beam of the network node and via a first subset of a plurality of IRSs, a first transmission, the first transmission comprising a first reference signal or a first SRS request, as described above.

As further shown in FIG. 10, in some aspects, process 1000 may include obtaining a first signal quality measurement based at least in part on the first transmission (block 1020). For example, the network node (e.g., using reception component 1202 and/or communication manager 1206, depicted in FIG. 12) may obtain a first signal quality measurement based at least in part on the first transmission, as described above.

As further shown in FIG. 10, in some aspects, process 1000 may include transmitting, to the UE and via the at least one beam and via a second subset of the plurality of IRSs, a second transmission, the second transmission comprising a second reference signal or a second SRS request (block 1030). For example, the network node (e.g., using transmission component 1204 and/or communication manager 1206, depicted in FIG. 12) may transmit, to the UE and via the at least one beam and via a second subset of the plurality of IRSs, a second transmission, the second transmission comprising a second reference signal or a second SRS request, as described above.

As further shown in FIG. 10, in some aspects, process 1000 may include obtaining a second signal quality measurement based at least in part on the second transmission (block 1040). For example, the network node (e.g., using reception component 1202 and/or communication manager 1206, depicted in FIG. 12) may obtain a second signal quality measurement based at least in part on the second transmission, as described above.

As further shown in FIG. 10, in some aspects, process 1000 may include identifying at least one IRS of the plurality of IRSs based at least in part on the first signal quality measurement and the second signal quality measurement (block 1050). For example, the network node (e.g., using communication manager 1206, depicted in FIG. 12) may identify at least one IRS of the plurality of IRSs based at least in part on the first signal quality measurement and the second signal quality measurement, as described above.

Process 1000 may include additional aspects, such as any single aspect or any combination of aspects described below and/or in connection with one or more other processes described elsewhere herein.

In a first aspect, process 1000 includes deactivating the plurality of IRSs, transmitting, to the UE and via the at least one beam, a baseline transmission while the plurality of IRSs are deactivated, and determining a baseline signal quality measurement based at least in part on the baseline transmission.

In a second aspect, alone or in combination with the first aspect, identifying the at least one IRS further comprises identifying the at least one IRS based at least in part on the baseline signal quality measurement.

In a third aspect, alone or in combination with one or more of the first and second aspects, process 1000 includes deactivating each of the plurality of IRSs, except for the first subset, prior to transmitting the first transmission.

In a fourth aspect, alone or in combination with one or more of the first through third aspects, process 1000 includes deactivating each of the plurality of IRSs, except for the second subset, prior to transmitting the second transmission.

In a fifth aspect, alone or in combination with one or more of the first through fourth aspects, identifying the at least one IRS comprises identifying the at least one IRS based at least in part on a signal quality threshold.

In a sixth aspect, alone or in combination with one or more of the first through fifth aspects, identifying the at least one IRS comprises identifying a first IRS of the first subset based at least in part on the first signal quality measurement being greater than the second signal quality measurement.

In a seventh aspect, alone or in combination with one or more of the first through sixth aspects, obtaining the first signal quality measurement comprises receiving, from the UE, a RSRP measurement associated with the first reference signal.

In an eighth aspect, alone or in combination with one or more of the first through seventh aspects, obtaining the first signal quality measurement comprises receiving, from the UE, an SRS associated with the first SRS request, and measuring a RSRP of the SRS.

In a ninth aspect, alone or in combination with one or more of the first through eighth aspects, process 1000 includes linearly sweeping through the plurality of IRSs to obtain a plurality of other signal quality measurements for the plurality of IRSs, wherein the first signal quality measurement and the second signal quality measurement are obtained as part of linearly sweeping through the plurality of IRSs, and wherein identifying the at least one IRS comprises identifying the at least one IRS based at least in part on the plurality of other signal quality measurements.

In a tenth aspect, alone or in combination with one or more of the first through ninth aspects, linearly sweeping through the plurality of IRSs comprises for each IRS of the plurality of IRSs deactivating each other IRS of the plurality of IRSs, and obtaining a signal quality measurement, of the plurality of other signal quality measurements, for the IRS.

In an eleventh aspect, alone or in combination with one or more of the first through tenth aspects, process 1000 includes logarithmically sweeping through the plurality of IRSs to obtain a plurality of other signal quality measurements for the plurality of IRSs, wherein the first signal quality measurement and the second signal quality measurement are obtained as part of logarithmically sweeping through the plurality of IRSs, and wherein identifying the at least one IRS comprises identifying the at least one IRS based at least in part on the plurality of other signal quality measurements.

In a twelfth aspect, alone or in combination with one or more of the first through eleventh aspects, logarithmically sweeping through the plurality of IRSs comprises for each subset of a plurality of subsets of the plurality of IRSs deactivating each IRS of the plurality of IRSs that are not included in the subset, and obtaining a signal quality measurement, of the plurality of other signal quality measurements, for the subset.

In a thirteenth aspect, alone or in combination with one or more of the first through twelfth aspects, each of the plurality of IRSs is associated with an IRS index comprising a bit string, and wherein each subset of the plurality of subsets of the plurality of IRSs comprises IRSs for which corresponding bit strings share a bit value at a particular bit of the bit string.

In a fourteenth aspect, alone or in combination with one or more of the first through thirteenth aspects, each of the plurality of IRSs is associated with a location, and wherein each subset of the plurality of subsets of the plurality of IRSs comprises IRSs within a proximity threshold.

In a fifteenth aspect, alone or in combination with one or more of the first through fourteenth aspects, process 1000 includes grouping the plurality of IRSs into a plurality of groups based at least in part on location, wherein each subset of the plurality of subsets of the plurality of IRSs comprises IRSs that do not share a group of the plurality of groups.

In a sixteenth aspect, alone or in combination with one or more of the first through fifteenth aspects, each of the plurality of IRSs comprises an IRS beam.

In a seventeenth aspect, alone or in combination with one or more of the first through sixteenth aspects, process 1000 includes determining that the UE has changed location, and sweeping through a second plurality of IRSs to obtain a plurality of other signal quality measurements for the second plurality of IRSs, wherein at least one IRS of the second plurality of IRSs is not included in the plurality of IRSs, and wherein the at least one IRS of the second plurality of IRSs comprises a neighbor of at least one IRS of the plurality of IRSs.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
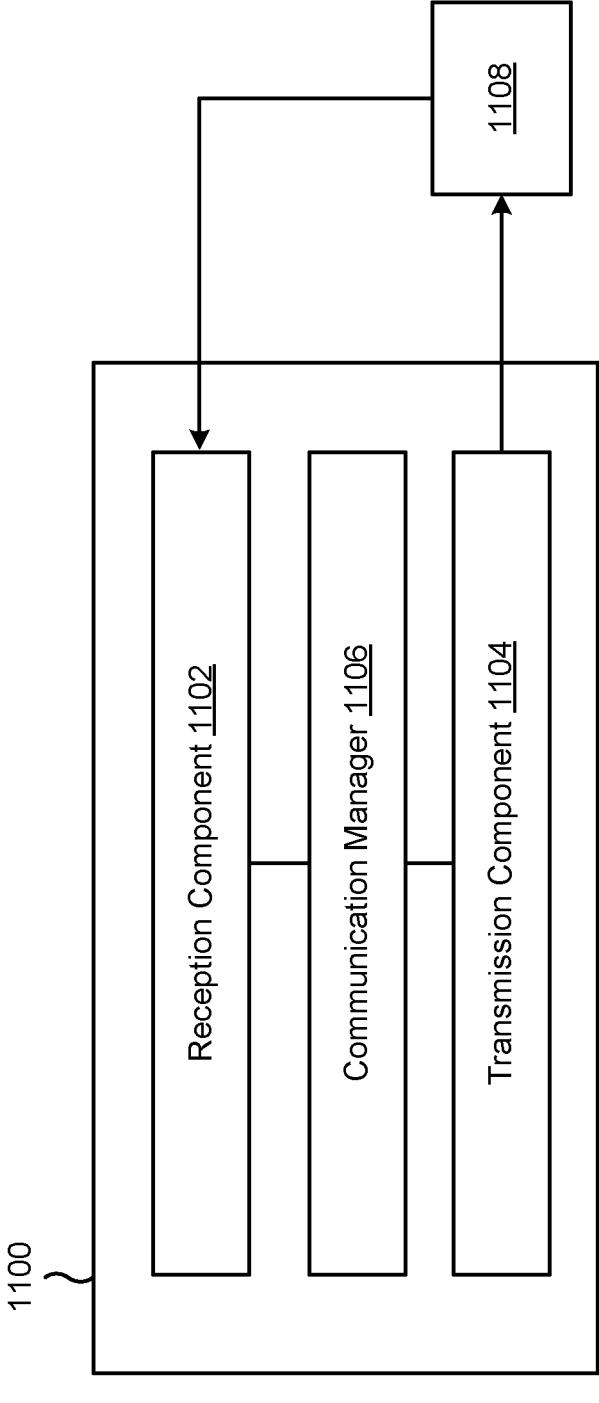
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102, a transmission component 1104, and/or a communication manager 1106, which may be in communication with one another (for example, via one or more buses and/or one or more other components). As shown, the apparatus 1100 may communicate with another apparatus 1108, such as a UE or a network node (such as a CU, a DU, an RU, or a base station), using the reception component 1102 and the transmission component 1104.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
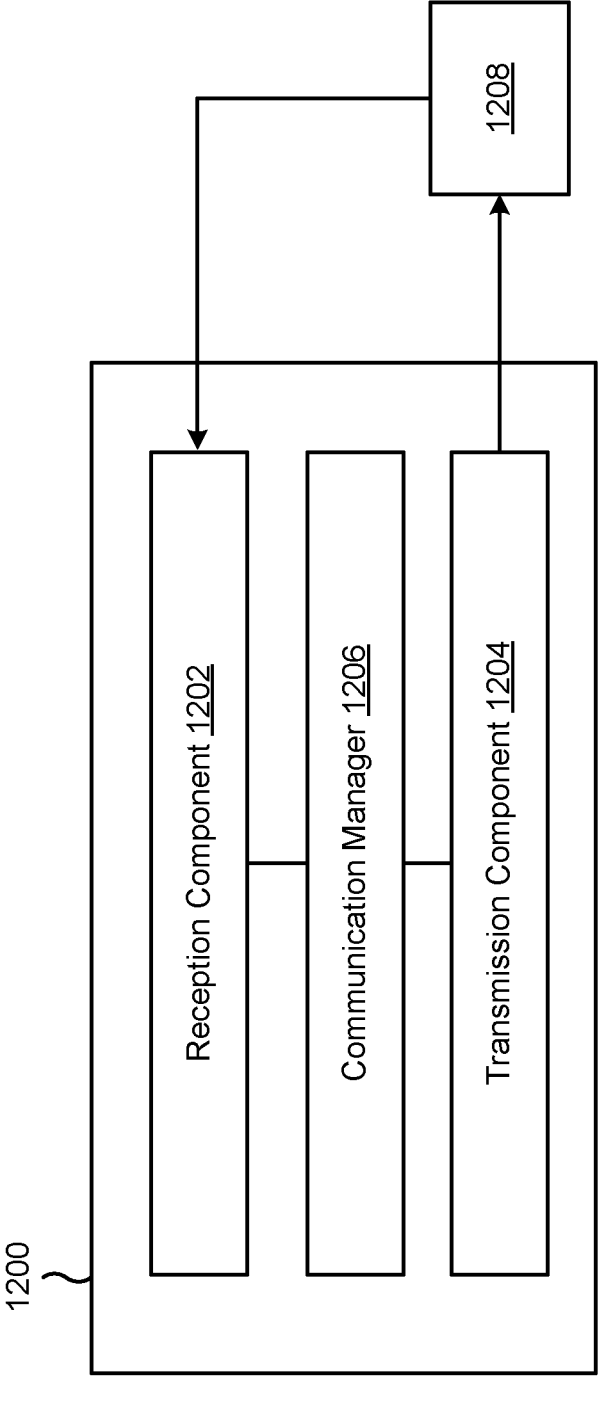
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a network node, or a network node may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 150 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 5-9. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node described in connection with FIG. 2. In some aspects, the reception component 1202 and/or the transmission component 1204 may include or may be included in a network interface. The network interface may be configured to obtain and/or output signals for the apparatus 1200 via one or more communications links, such as a backhaul link, a midhaul link, and/or a fronthaul link.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the network node described in connection with FIG. 2. In some aspects, the transmission component 1204 may be co-located with the reception component 1202 in a transceiver.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The transmission component 1204 may transmit, to a UE and via at least one beam of the network node and via a first subset of a plurality of IRSs, a first transmission the first transmission comprising a first reference signal or a first SRS request. The reception component 1202 may obtain a first signal quality measurement based at least in part on the first transmission. The transmission component 1204 may transmit, to the UE and via the at least one beam and via a second subset of the plurality of IRSs, a second transmission the second transmission comprising a second reference signal or a second SRS request. The reception component 1202 may obtain a second signal quality measurement based at least in part on the second transmission. The communication manager 1206 may identify at least one IRS of the plurality of IRSs based at least in part on the first signal quality measurement and the second signal quality measurement.

The communication manager 1206 may deactivate the plurality of IRSs.

The transmission component 1204 may transmit, to the UE and via the at least one beam, a baseline transmission while the plurality of IRSs are deactivated.

The communication manager 1206 may determine a baseline signal quality measurement based at least in part on the baseline transmission.

The communication manager 1206 may deactivate each of the plurality of IRSs, except for the first subset, prior to transmitting the first transmission.

The communication manager 1206 may deactivate each of the plurality of IRSs, except for the second subset, prior to transmitting the second transmission.

The communication manager 1206 may linearly sweep through the plurality of IRSs to obtain a plurality of other signal quality measurements for the plurality of IRSs wherein the first signal quality measurement and the second signal quality measurement are obtained as part of linearly sweeping through the plurality of IRSs.

The communication manager 1206 may logarithmically sweep through the plurality of IRSs to obtain a plurality of other signal quality measurements for the plurality of IRSs wherein the first signal quality measurement and the second signal quality measurement are obtained as part of logarithmically sweeping through the plurality of IRSs.

The communication manager 1206 may group the plurality of IRSs into a plurality of groups based at least in part on location wherein each subset of the plurality of subsets of the plurality of IRSs comprises IRSs that do not share a group of the plurality of groups.

The communication manager 1206 may determine that the UE has changed location sweeping through a second plurality of IRSs to obtain a plurality of other signal quality measurements for the second plurality of IRSs, wherein at least one IRS of the second plurality of IRSs is not included in the plurality of IRSs.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a network node, comprising: transmitting, to a UE and via at least one beam of the network node and via a first subset of a plurality of IRSs, a first transmission, the first transmission comprising a first reference signal or a first SRS request; obtaining a first signal quality measurement based at least in part on the first transmission; transmitting, to the UE and via the at least one beam and via a second subset of the plurality of IRSs, a second transmission, the second transmission comprising a second reference signal or a second SRS request; obtaining a second signal quality measurement based at least in part on the second transmission; and identifying at least one IRS of the plurality of IRSs based at least in part on the first signal quality measurement and the second signal quality measurement.

Aspect 2: The method of Aspect 1, further comprising: deactivating the plurality of IRSs; transmitting, to the UE and via the at least one beam, a baseline transmission while the plurality of IRSs are deactivated; and determining a baseline signal quality measurement based at least in part on the baseline transmission.

Aspect 3: The method of Aspect 2, wherein identifying the at least one IRS further comprises: identifying the at least one IRS based at least in part on the baseline signal quality measurement.

Aspect 4: The method of any of Aspects 1-3, further comprising: deactivating each of the plurality of IRSs, except for the first subset, prior to transmitting the first transmission.

Aspect 5: The method of any of Aspects 1-4, further comprising: deactivating each of the plurality of IRSs, except for the second subset, prior to transmitting the second transmission.

Aspect 6: The method of any of Aspects 1-5, wherein identifying the at least one IRS comprises: identifying the at least one IRS based at least in part on a signal quality threshold.

Aspect 7: The method of any of Aspects 1-6, wherein identifying the at least one IRS comprises: identifying a first IRS of the first subset based at least in part on the first signal quality measurement being greater than the second signal quality measurement.

Aspect 8: The method of any of Aspects 1-7, wherein obtaining the first signal quality measurement comprises: receiving, from the UE, a RSRP measurement associated with the first reference signal.

Aspect 9: The method of any of Aspects 1-8, wherein obtaining the first signal quality measurement comprises: receiving, from the UE, an SRS associated with the first SRS request; and measuring a RSRP of the SRS.

Aspect 10: The method of any of Aspects 1-9, further comprising: linearly sweeping through the plurality of IRSs to obtain a plurality of other signal quality measurements for the plurality of IRSs, wherein the first signal quality measurement and the second signal quality measurement are obtained as part of linearly sweeping through the plurality of IRSs; and wherein identifying the at least one IRS comprises: identifying the at least one IRS based at least in part on the plurality of other signal quality measurements.

Aspect 11: The method of Aspect 10, wherein linearly sweeping through the plurality of IRSs comprises: for each IRS of the plurality of IRSs: deactivating each other IRS of the plurality of IRSs; and obtaining a signal quality measurement, of the plurality of other signal quality measurements, for the IRS.

Aspect 12: The method of any of Aspects 1-11, further comprising: logarithmically sweeping through the plurality of IRSs to obtain a plurality of other signal quality measurements for the plurality of IRSs, wherein the first signal quality measurement and the second signal quality measurement are obtained as part of logarithmically sweeping through the plurality of IRSs; and wherein identifying the at least one IRS comprises: identifying the at least one IRS based at least in part on the plurality of other signal quality measurements.

Aspect 13: The method of Aspect 12, wherein logarithmically sweeping through the plurality of IRSs comprises: for each subset of a plurality of subsets of the plurality of IRSs: deactivating each IRS of the plurality of IRSs that are not included in the subset; and obtaining a signal quality measurement, of the plurality of other signal quality measurements, for the subset.

Aspect 14: The method of Aspect 13, wherein each of the plurality of IRSs is associated with an IRS index comprising a bit string; and wherein each subset of the plurality of subsets of the plurality of IRSs comprises IRSs for which corresponding bit strings share a bit value at a particular bit of the bit string.

Aspect 15: The method of Aspect 13, wherein each of the plurality of IRSs is associated with a location; and wherein each subset of the plurality of subsets of the plurality of IRSs comprises IRSs within a proximity threshold.

Aspect 16: The method of Aspect 13, further comprising: grouping the plurality of IRSs into a plurality of groups based at least in part on location, wherein each subset of the plurality of subsets of the plurality of IRSs comprises IRSs that do not share a group of the plurality of groups.

Aspect 17: The method of any of Aspects 1-16, wherein each of the plurality of IRSs comprises an IRS beam.

Aspect 18: The method of any of Aspects 1-17, further comprising: determining that the UE has changed location; and sweeping through a second plurality of IRSs to obtain a plurality of other signal quality measurements for the second plurality of IRSs, wherein at least one IRS of the second plurality of IRSs is not included in the plurality of IRSs, and wherein the at least one IRS of the second plurality of IRSs comprises a neighbor of at least one IRS of the plurality of IRSs, wherein the at least one IRS of the second plurality of IRSs comprises a neighbor of at least one IRS of the plurality of IRSs.

Aspect 19: An apparatus for wireless communication at a device, comprising a processor; memory coupled with the processor; and instructions stored in the memory and executable by the processor to cause the apparatus to perform the method of one or more of Aspects 1-18.

Aspect 20: A device for wireless communication, comprising a memory and one or more processors coupled to the memory, the one or more processors configured to perform the method of one or more of Aspects 1-18.

Aspect 21: An apparatus for wireless communication, comprising at least one means for performing the method of one or more of Aspects 1-18.

Aspect 22: A non-transitory computer-readable medium storing code for wireless communication, the code comprising instructions executable by a processor to perform the method of one or more of Aspects 1-18.

Aspect 23: A non-transitory computer-readable medium storing a set of instructions for wireless communication, the set of instructions comprising one or more instructions that, when executed by one or more processors of a device, cause the device to perform the method of one or more of Aspects 1-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network node for wireless communication, comprising:

a memory; and one or more processors, coupled to the memory, configured to:

transmit, to a user equipment (UE) and via at least one beam of the network node and via a first subset of a plurality of intelligent reflection surfaces (IRSs), a first transmission, the first transmission comprising a first sounding reference signal (SRS) request;

receive, from the UE, a first SRS associated with the first SRS request;

obtain a first signal quality measurement based at least in part on the first transmission, wherein the first signal quality measurement comprises a first reference signal received power (RSRP) associated with the first SRS;

transmit, to the UE and via the at least one beam and via a second subset of the plurality of IRSs, a second transmission, the second transmission comprising a second SRS request;

receive, from the UE, a second SRS associated with the second SRS request;

obtain a second signal quality measurement based at least in part on the second transmission, wherein the second signal quality measurement comprises a second RSRP associated with the second SRS; and identify at least one IRS of the plurality of IRSs based at least in part on the first signal quality measurement and the second signal quality measurement.

2. The network node of claim 1, wherein the one or more processors are further configured to:

deactivate the plurality of IRSs;

transmit, to the UE and via the at least one beam, a baseline transmission while the plurality of IRSs are deactivated; and determine a baseline signal quality measurement based at least in part on the baseline transmission.

3. The network node of claim 2, wherein the one or more processors, to identify the at least one IRS, are configured to:

identify the at least one IRS based at least in part on the baseline signal quality measurement.

4. The network node of claim 1, wherein the one or more processors are further configured to:

deactivate each of the plurality of IRSs, except for the first subset, prior to transmitting the first transmission.

5. The network node of claim 1, wherein the one or more processors are further configured to:

deactivate each of the plurality of IRSs, except for the second subset, prior to transmitting the second transmission.

6. The network node of claim 1, wherein the one or more processors, to identify the at least one IRS, are configured to:

identify the at least one IRS based at least in part on a signal quality threshold.

7. The network node of claim 1, wherein the one or more processors, to identify the at least one IRS, are configured to:

identify a first IRS of the first subset based at least in part on the first signal quality measurement being greater than the second signal quality measurement.

8. The network node of claim 1, wherein the one or more processors, to obtain the first signal quality measurement, are configured to:

receive, from the UE, a measurement associated with the first SRS.

9. The network node of claim 1, wherein the one or more processors are further configured to:

determine that the UE has changed location; and sweep through a second plurality of IRSs to obtain a plurality of other signal quality measurements for the second plurality of IRSs, wherein at least one IRS of the second plurality of IRSs is not included in the plurality of IRSs, and wherein the at least one IRS of the second plurality of IRSs comprises a neighbor of at least one IRS of the plurality of IRSs.

10. The network node of claim 1, wherein the one or more processors are further configured to:

linearly sweep through the plurality of IRSs to obtain a plurality of other signal quality measurements for the plurality of IRSs, wherein the first signal quality measurement and the second signal quality measurement are obtained as part of linearly sweeping through the plurality of IRSs; and wherein the one or more processors, to identify the at least one IRS, are configured to:

identify the at least one IRS based at least in part on the plurality of other signal quality measurements.

11. The network node of claim 10, wherein the one or more processors, to linearly sweep through the plurality of IRSs, are configured to:

for each IRS of the plurality of IRSs:

deactivate each other IRS of the plurality of IRSs; and obtaining a signal quality measurement, of the plurality of other signal quality measurements, for the IRS.

12. The network node of claim 1, wherein the one or more processors are further configured to:

logarithmically sweep through the plurality of IRSs to obtain a plurality of other signal quality measurements for the plurality of IRSs, wherein the first signal quality measurement and the second signal quality measurement are obtained as part of logarithmically sweeping through the plurality of IRSs; and wherein the one or more processors, to identify the at least one IRS, are configured to:

identify the at least one IRS based at least in part on the plurality of other signal quality measurements.

13. The network node of claim 12, wherein the one or more processors, to logarithmically sweep through the plurality of IRSs, are configured to:

for each subset of a plurality of subsets of the plurality of IRSs:

deactivate each IRS of the plurality of IRSs that are not included in the subset; and obtain a signal quality measurement, of the plurality of other signal quality measurements, for the subset.

14. The network node of claim 13, wherein each of the plurality of IRSs is associated with an IRS index comprising a bit string; and wherein each subset of the plurality of subsets of the plurality of IRSs comprises IRSs for which corresponding bit strings share a bit value at a particular bit of the bit string.

15. The network node of claim 13, wherein each of the plurality of IRSs is associated with a location; and wherein each subset of the plurality of subsets of the plurality of IRSs comprises IRSs within a proximity threshold.

16. The network node of claim 13, wherein the one or more processors are further configured to:

group the plurality of IRSs into a plurality of groups based at least in part on location,

37 wherein each subset of the plurality of subsets of the plurality of IRSs comprises IRSs that do not share a group of the plurality of groups.

17. The network node of claim 1, wherein each of the plurality of IRSs comprises an IRS beam.

18. A method of wireless communication performed by a network node, comprising:
transmitting, to a user equipment (UE) and via at least one beam of the network node and via a first subset of a plurality of intelligent reflection surfaces (IRSs), a first transmission,
the first transmission comprising a first sounding reference signal (SRS) request;
receiving, from the UE, a first SRS associated with the first SRS request;
obtaining a first signal quality measurement based at least in part on the first transmission, wherein the first signal quality measurement comprises a first reference signal received power (RSRP) associated with the first SRS;
transmitting, to the UE and via the at least one beam and via a second subset of the plurality of IRSs, a second transmission,
the second transmission comprising a second SRS request;
receiving, from the UE, a second SRS associated with the second SRS request;
obtaining a second signal quality measurement based at least in part on the second transmission, wherein the second signal quality measurement comprises a second RSRP associated with the second SRS; and
identifying at least one IRS of the plurality of IRSs based at least in part on the first signal quality measurement and the second signal quality measurement.

19. The method of claim 18, further comprising:
logarithmically sweeping through the plurality of IRSs to obtain a plurality of other signal quality measurements for the plurality of IRSs,
wherein the first signal quality measurement and the second signal quality measurement are obtained as part of logarithmically sweeping through the plurality of IRSs; and
wherein identifying the at least one IRS comprises:
identifying the at least one IRS based at least in part on the plurality of other signal quality measurements.

20. The method of claim 18, further comprising:
deactivating the plurality of IRSs;
transmitting, to the UE and via the at least one beam, a baseline transmission while the plurality of IRSs are deactivated; and
determining a baseline signal quality measurement based at least in part on the baseline transmission.

21. The method of claim 20,
wherein identifying the at least one IRS further comprises:
identifying the at least one IRS based at least in part on the baseline signal quality measurement.

22. The method of claim 18, further comprising:
deactivating each of the plurality of IRSs, except for the first subset, prior to transmitting the first transmission.

23. The method of claim 18, further comprising:
deactivating each of the plurality of IRSs, except for the second subset, prior to transmitting the second transmission.

24. The method of claim 18,
wherein identifying the at least one IRS comprises:

38 identifying a first IRS of the first subset based at least in part on the first signal quality measurement being greater than the second signal quality measurement.

25. The method of claim 18,
wherein obtaining the first signal quality measurement comprises:
receiving, from the UE, a RSRP measurement associated with the first SRS.

26. The method of claim 18, further comprising:
linearly sweeping through the plurality of IRSs to obtain a plurality of other signal quality measurements for the plurality of IRSs,
wherein the first signal quality measurement and the second signal quality measurement are obtained as part of linearly sweeping through the plurality of IRSs; and
wherein identifying the at least one IRS comprises:
identifying the at least one IRS based at least in part on the plurality of other signal quality measurements.

27. A non-transitory computer-readable medium storing a set of instructions for wireless communication, the set of instructions comprising:
one or more instructions that, when executed by one or more processors of a network node, cause the network node to:
transmit, to a user equipment (UE) and via at least one beam of the network node and via a first subset of a plurality of intelligent reflection surfaces (IRSs), a first transmission,
the first transmission comprising a first sounding reference signal (SRS) request;
receive, from the UE, a first SRS associated with the first SRS request;
obtain a first signal quality measurement based at least in part on the first transmission, wherein the first signal quality measurement comprises a first reference signal received power (RSRP) associated with the first SRS;
transmit, to the UE and via the at least one beam and via a second subset of the plurality of IRSs, a second transmission,
the second transmission comprising a second SRS request;
receive, from the UE, a second SRS associated with the second SRS request;
obtain a second signal quality measurement based at least in part on the second transmission, wherein the second signal quality measurement comprises a second RSRP associated with the second SRS; and
identify at least one IRS of the plurality of IRSs based at least in part on the first signal quality measurement and the second signal quality measurement.

28. The non-transitory computer-readable medium of claim 27, wherein the one or more instructions that, when executed by the one or more processors of a network node, further cause the network node to:
deactivate the plurality of IRSs;
transmit, to the UE and via the at least one beam, a baseline transmission while the plurality of IRSs are deactivated; and
determine a baseline signal quality measurement based at least in part on the baseline transmission.

29. An apparatus for wireless communication, comprising:
means for transmitting, to a user equipment (UE) and via at least one beam of a network node and via a first subset of a plurality of intelligent reflection surfaces (IRSs), a first transmission, the first transmission comprising a first sounding reference signal (SRS) request;

means for receiving, from the UE, a first SRS associated with the first SRS request;

means for obtaining a first signal quality measurement based at least in part on the first transmission, wherein the first signal quality measurement comprises a first reference signal received power (RSRP) associated with the first SRS;

means for transmitting, to the UE and via the at least one beam and via a second subset of the plurality of IRSs, a second transmission, the second transmission comprising a second SRS request;

means for receiving, from the UE, a second SRS associated with the second SRS request;

means for obtaining a second signal quality measurement based at least in part on the second transmission, wherein the second signal quality measurement comprises a second RSRP associated with the second SRS; and means for identifying at least one IRS of the plurality of IRSs based at least in part on the first signal quality measurement and the second signal quality measurement.

30. The apparatus of claim 29, further comprising:

means for deactivate the plurality of IRSs;

means for transmitting, to the UE and via the at least one beam, a baseline transmission while the plurality of IRSs are deactivated; and means for determining a baseline signal quality measurement based at least in part on the baseline transmission.

* * * * *